Figure 1:
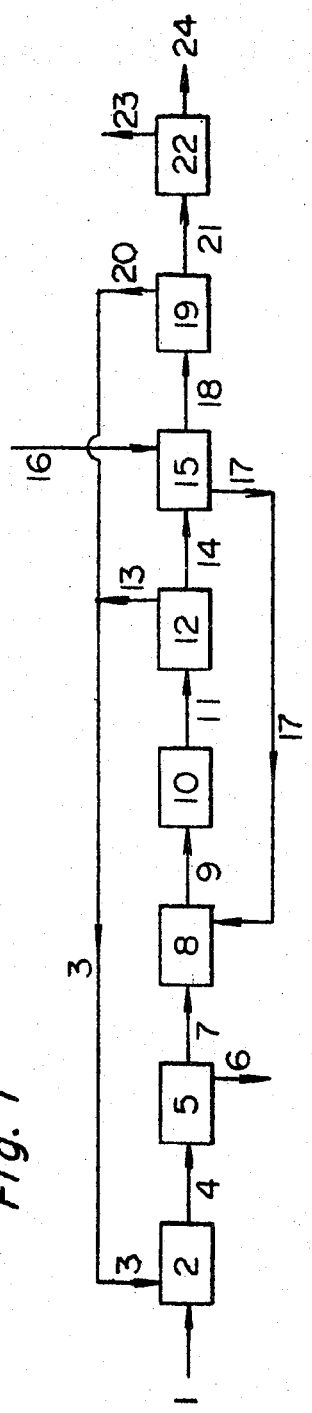

United States Patent [19]

Shimizu et al.

[11] 3,767,424
[45] Oct. 23, 1973

[54] METHOD OF SELECTIVE SEPARATION OF KONJAC FLOUR FROM THE TUBERS OF AMORPHOPHALLUS KONJAC

[75] Inventors: Manzo Shimizu, Onomichi; Hideo Shimahara, Mihara, both of Japan

[73] Assignee: Kabushiki Kaisha Shimizu Manzo Shoten, Onomichi-shi, Japan

[22] Filed: Sept. 14, 1971

[21] Appl. No.: 180,405

[52] U.S. Cl.................. 426/372, 426/431, 426/464
[51] Int. Cl........................... A21d 2/00, A21d 6/00
[58] Field of Search ............................ 99/93, 100 P

[56] References Cited
UNITED STATES PATENTS
2,584,893  2/1952  Lloyd et al............................. 99/93
3,287,138  11/1966  Pearson et al........................... 99/93

Primary Examiner—Raymond N. Jones
Attorney—Sherman & Shalloway

[57] ABSTRACT

A method of extracting konjac flour from the tubers of Amorphophallus konjac, wherein, in producing konjac flour by the wet comminution of the tubers of Amorphophallus konjac, the konjac flour separated after the comminution operation is submitted to further polishing to remove the tachiko (dust from Amorphophallus konjac) which adheres to the surface of the konjac flour.

8 Claims, 2 Drawing Figures

METHOD OF SELECTIVE SEPARATION OF KONJAC FLOUR FROM THE TUBERS OF AMORPHOPHALLUS KONJAC

This invention relates to improvements in the method of producing konjac flour from the tubers of Amorphophallus konjac, C. Koch (for brevity, referred to hereinafter as konjac tuber).

The konjac tuber contains what is called konjac flour, a component consisting principally of glucomannan and, in addition, what is called tachiko (dust from the konjac tuber), an impurity consisting of starch, protein, etc. In producing konjac flour from the konjac tuber, the konjac flour and the tachiko must be separated, after which the former is withdrawn.

To accomplish this, the konjac tuber must be comminuted. However, when the konjac tuber is comminuted in its raw state, the comminuted product becomes exceedingly viscous and sticks to the pulverizer, with the consequence that not only is there a drop in the performance of the pulverizer but also difficulty is experienced in withdrawing the comminuted product externally of the pulverizer.

Therefore, the dry method of preparation of the konjac flour from the tuber has been traditionally adopted, i. e., the sliced konjac tubers are dried either by exposure to sunlight or by means of hot air and thereafter the dried sliced tubers are comminuted with a mill and then separated by air elutriation. In this method the sliced tubers become hard and the konjac flour component and the tachiko component stick firmly together. Thus, an excessively prolonged time is required for the comminution operation. In addition, a large amount of the konjac flour component remaining adhered to the separated tachiko component gets into the latter to cause a decline in the yield of the konjac flour.

To eliminate the foregoing shortcomings of the dry method, a wet method of extracting the konjac flour has been developed, which comprises comminuting undried tubers with a pulverizer in a liquid medium such as water-miscible organic solvent and thereafter separating by means of sieving from the resulting slurry the konjac flour of relatively large particles and the fine powdery tachiko. However, this method is not being practiced, because of the great deviation in product quality as well as the much greater rate of the production of products of poor quality, notwithstanding the fact that this method is superior to the dry method with respect to its yield and time required for accomplishing the communition. The reason is believed to be due to the fact that the hydrophilic property of the konjac flour product is impeded as a result of the surface of the product being still enveloped by the tachiko component.

It is therefore an object of this invention to overcome the shortcomings that are possessed by the conventional wet method and to provide an improved wet method by which konjac flour of stable quality can be obtained.

Another object of the invention is to provide a method by which konjac flour of superior quality can be obtained from the raw konjac tubers in good yield.

Other objects and advantages of the invention will become apparent from the following description.

According to the present invention, a method of extracting konjac flour of uniform quality from the raw konjac tubers is provided, such method comprising the steps of comminuting the konjac tubers in a liquid medium to form a slurry consisting of coarse konjac flour particles of a diameter above about $2 \times 10^{-2}$mm and a fine tachiko powder particles of a diameter not greater than about $1 \times 10^{-2}$mm in suspension in the aforesaid liquid medium, separating and withdrawing the coarse konjac flour particles from the slurry, polishing the withdrawing coarse konjac flour in a water-miscible organic solvent to strip from the surface of the coarse konjac flour particles the tachiko component that still remains adhered thereto, withdrawing the konjac flour from the water-miscible organic solvent, and thereafter drying the so obtained flour.

Either water or a water-miscible organic solvent is used as the pulverizing medium. Thus, the present invention comprehends both the method which uses water as the pulverizing medium and that which uses a water-miscible organic solvent as the pulverizing medium. However, in both cases it is of vital importance to include a step wherein the coarse konjac flour particles separated and withdrawn from the comminuted product slurry are polished in a water-miscible organic solvent to remove the tachiko component that still remains adhered to the surface of the coarse konjac flour particles. As a consequence of having been submitted to this step, the konjac flour finally obtained is not only one the hydrophilic property of which has been notably increased but one with uniform quality is uniform as well.

Konjac flour swells and becomes viscous in a short period of time on contact with water. Therefore, in the method which uses water as the pulverizing medium the comminution and the next following step of separating the water and the coarse konjac flour must be carried out in a very short period of time e.g., less than one minute. However, the amount of the water-miscible organic solvent consumed is a small amount of about one-half that of the case where a water-miscible organic solvent is used as the pulverizing medium. On the other hand, in the case of the method which uses a water-miscible organic solvent as the pulverizing medium, while a larger amount of the water-miscible organic solvent is required than in the case of the method in which water is used, there is the advantage that there is no possibility of the konjac flour swelling and becoming viscous as in the case where water is used.

In either case the konjac flour particles, which have been withdrawn after having been submitted to the polishing step, are dried to obtain the final product having a moisture content of 10 to 16 percent by weight. The concentration of the water-miscible organic solvent contained or entrained in the konjac flour particles which are submitted to the drying step and the drying temperature has a bearing on the quality of the product. Best results are had when the aforesaid solvent concentration is at least 30 percent by volume and the drying temperature ranges from 50°C. to 130°C. The concentration of the water-miscible solvent which is contained or in entrainment with the konjac flour particles to be submitted to the drying step is preferably adjusted to at least 30 percent by volume by the following procedure. That is, the konjac flour, which has been withdrawn after having undergone the polishing treatment, is dipped into a tank containing a water-miscible solvent, the concentration of which has been adjusted in advance.

When a water-miscible organic solvent is used as the pulverizing medium, the konjac flour withdrawn after having undergone the polishing treatment is best washed with a fresh water-miscible solvent. The tachiko remaining in the konjac flour can be eliminated by this procedure and a further enhancement of the hydrophilic property of the konjac flour can be had. Washing can be advantageously carried out by mixing the polished konjac flour thoroughly with the water-miscible organic solvent. The washing step can also serve as the step for adjusting the hereinbefore described concentration of the water-miscible organic solvent to be contained or entrained in the konjac flour particles which are to be submitted to the drying steps.

The water-miscible organic solvent used in the invention may be an organic solvent which commingles in a homogeneous phase with water. Conveniently useable are such as methanol, ethanol, propanol, acetone and 5 percent ethyl acetate-modified ethanol. N,N-dimethylformamide and ethylene glycol dimethyl ether can also be used. In most cases, the water-miscible organic solvent is used in the form of a aqueous solution.

In the case of the method of extracting the konjac flour by the wet method, it frequently happens that the four is discolored to an excessive degree during the extraction process. According to the present invention, this discoloration can be prevented without impairing the hydrophilic property of the konjac flour by the incorporation in the pulverizing medium of a sodium or potassium salt of sulfurous or hyposulfurous acid as a bleaching agent. Addition of the foregoing salts in an amount of 100 to 200 ppm will suffice. If desired, the bleaching agent may also be added to the water-miscible organic solvent used in the polishing operation.

Figure 2:
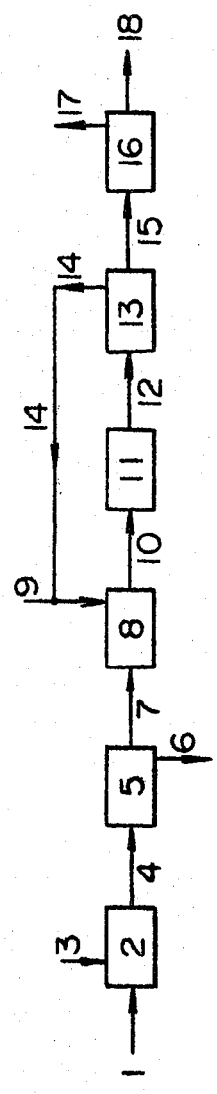

A better understanding of the invention will be had by referring to the accompanying drawings, wherein FIG. 1 is a flow chart illustrating the sequence of the processing steps of a preferred mode of operating the invention when using a water-miscible organic solvent as the pulverizing medium and FIG. 2 is a similar chart illustrating the case where water is used as the pulverizing medium. Unless otherwise specified, the proportions used in the following description are on a weight basis.

In FIG. 1 the starting raw tubers are fed continuously to a pulverizer 2 by a customary feed means 1 such as a belt conveyor. The starting raw tuber usually is composed of about 80 – 90 percent water and 20 – 10 percent solids, and of the total solids portion, about 60 – 80 percent is the konjac flour component and about 40 – 20 percent in the tachiko component. The water-miscible organic solvent is fed concurrently from line 3. The solvent can be fed in about 1.5 to three-fold amount of the weight of the starting tubers, the preferred amount being such that its concentration after dilution by means of the water contained in the starting tubers is 30 – 60 percent by volume (29 – 52 percent by weight). The water-miscible organic solvent should be one which has been incorporated with 100 to 200 ppm of a bleaching agent. While the starting tuber is used in its raw state, as hereinbefore indicated, it also can be used in a state in which it has been sliced and dried in advance. When used in this sliced and dried material it is preferably swelled in water prior to feeding it to the pulverizer 2.

The starting tubers are comminuted at the pulverizer 2 in the presence of the water-miscible organic solvent. The comminution of the starting tubers is continued until the tuberous mass made up of konjac flour particles is broken up into particles of a diameter about $2 \times 10^{-2}$ mm or particles consisting of a congregation of a number of such particles. As a result, the tachiko component, such as starch and proteins, which is present interstitially among the konjac flour particles in the tuberous mass, becomes munute particles of a diameter less than about $1 \times 10^{-2}$ mm which float is the solvent. Therefore, the coarse konjac flour particles become separated. As the pulverizer to be used in this case, mention can be made of the hammer mill and the shearing roll mill, of which the former is more conveniently used.

The konjac tubers which have been comminuted in the pulverizer 2 leave the same as a slurry containing about 5 to 20 percent of solids consisting of coarse konjac flour and fine tachiko powder. This slurry can be readily conveyed by means of a pump to the first separator 5. The slurry which has been conveyed to the first separator 5 via line 4 is separated into the coarse konjac flour particles and a spent liquor at this separator. While the spent liquor is discarded via line 6, it is possible to recover the water-miscible organic solvent from this spent liquor, if desired. Any of the usual separators can be used, but a fractional centrifugal separator and the settling tank are conveniently used, the former being especially suitable. When using the fractional centrifugal separator, it is preferred that the solids content of the slurry be as low as possible, 6 to 12 percent being suitable. However, a great difference exists between the konjac flour content and the tachiko powder content in the slurry, such as 90 percent and 10 percent, a slurry with a high solids content such as 15 to 20 percent can be used. When a settling tank is used, a sharp separation of the konjac flour particles and the tachiko powder can be achieved, but a settling tank of great capacity is required. Above 80 percent of the tachiko is eliminated along with the spent liquor and the konjac flour is separated in the form of a slurry whose content has been concentrated to 30 – 35 percent.

The coarse konjac flour particles separated at the first separator 5 are then conveyed in a concentrated slurry state to a mixing tank 8 via line 7 by means of a screw conveyor, at which mixing tank 8 the coarse konjac flour particles are mixed with the polishing medium, a water-miscible organic solvent, which is fed via line 17. The coarse konjac flour particles are thus conveyed in the form of a slurry of solids content of 5 – 20 percent, and preferably 8 – 12 percent, to a polisher 10 via line 9 by means of a pump. The water-miscible organic solvent used here is the same as that used as the pulverizing medium and can be similarly incorporated with a bleaching agent. The coarse konjac flour particles are polished in the polisher 10 in the presence of the water-miscible organic solvent. Thus the tachiko component which still remains adhered to the surface of the coarse konjac flour particles is removed therefrom. A grinder, screw extruder or a mixer equipped with a rotating vane can be used as the polisher.

The polished konjac flour leaves the polisher 10 in a slurry form along with the polishing medium and the tachiko which has been removed by polishing, and is pumped to a second separator via line 11, in which separator the konjac flour and spent liquor are separated as in the hereinbefore described first separator. The spent liquor is recycled via line 13 and line 3 to the pulverizer 2 to be reused as the pulverizing medium. However, the solvent can be recovered from the spent liquor, if desired.

The separated konjac flour of thick slurry form is then delivered via line 14 to a washing tank 15 where it is washed by thorough mixing with a fresh supply of wash liquid fed via line 16. This washing is preferably accomplished by a procedure consisting of passing the konjac flour successively through a plurality of washing tanks containing wash liquids of progrersively higher concentrations, but any of the other conventional procedures can also be used. The wash liquid used can be one which is the same as that used as the pulverizing medium and the polishing medium. A bleaching agent can be added in this case also. The concentration of the wash liquid and the quantitative proportion of the konjac flour to be washed are best chosen so that the concentration of the water-miscible solvent contained or entrained in the konjac flour after its washing is adjusted to at least 30 percent by volume, and preferably at least 50 percent by volume. However, the concentration of the water-miscible solvent contained or entrained in the konjac flour can also be adjusted after it has been once withdrawn from the washing tank after its washing; i.e., by again contacting it with a water-miscible solvent by means of a suitable method such as by dipping it in a tank filled with a water-miscible organic solvent.

The wash liquid fed to the washing tank 15, after having been mixed with the konjac flour, overflows and is returned via line 17 to the mixing tank 8 for reuse of the polishing medium.

The konjac flour, whose washing has been completed, is delivered via line 18 to a third separator 19, where it is separated from the wash mother liquor. The wash mother liquor withdrawn via line 20 joins with the spent liquor from the second separator 12 and is then recycled via line 3 to the pulverizer 2 as the pulverizing medium.

The konjac flour, which has been withdrawn after having passed through the hereinbefore described steps, is then finally conveyed via line 21 to a dryer 22 where it is dried to yield the final product. The drying is carried out at a temperature ranging between 50° and 130°C., and preferably between 70° and 100°C. While no special restrictions are imposed as to the dryer to be used, preferred is the type wherein the evaporated vapor is promptly carried off such as a fluidized bed dryer or an air current dryer. If desired, the evaporated solvent can be recovered via line 23. Adverse effects are had on the product when the time required for drying exceeds 90 minutes or when the temperature of the product at the time of completion of the drying exceeds 120°C. The product is withdrawn via line 24.

In the process illustrated in FIG. 2, instead of the water-miscible organic solvent a 2 to 10-fold amount of water relative to the starting tubers is used. Otherwise the comminution of the starting tubers is carried out as in the case with the comminution process illustrated in FIG. 1.

The starting tubers 1 are continuously fed to a pulverizer 2 while water is concurrently fed via line 3. The konjac tubers, which have been comminuted at the pulverizer 2, leaves the pulverizer via line 4 as an aqueous slurry containing the solid components consisting of a coarse konjac flour and a tachiko component and enters separator 5. Since the coarse konjac flour swells on contact with water and becomes pasty, for example, in from 5 to 7 minutes with a five-fold amount of water relative to the starting tubers has been used as the pulverizing medium to make it difficult to carry out the dehydration of the flour, the separation of the tachiko from the coarse konjac flour must be carried out immediately following the comminution step. Therefore, in this case the separation be settling as in FIG. 1 cannot be employed, and a separator having the ability of accomplishing the separation rapidly, such as a centrifugal dryer or a suction filter, must be used. The separation of the coarse konjac flour within one minute using a centrifugal dehydrator, and especially a basket-type centrifugal dehydrator, is to be preferred. The water containing the tachiko is discarded as spent liquor via line 6.

The coarse konjac flour separated from the pulverizing medium immediately enters a mixing tank 8 via line 7 and is mixed with a water-miscible solvent fed via line 9, following which the mixture is conveyed via line 10 to the next following polisher 11. Subsequently, the same steps as in the case of the mode shown in FIG. 1 are followed, and the konjac flour product is obtained. However, the washing with the water-miscible organic solvent can be omitted in the case of the mode shown in FIG. 2, which uses water as the pulverizing medium. The reason is that in the case where water is used as the pulverizing medium the separation of tachiko and the konjac flour takes place readily in that a major portion of the tachiko is removed in the separation step subsequent to the comminution step. The reference numerals 13 and 16 are respectively the second separator and the dryer. These correspond to the second separator 12 and dryer 22 of FIG. 1.

The konjac flour obtained by the method of the present invention, which has been fully described above, becomes one possessing excellent viscosity and of stable quality as a result of the stripping in the polishing step of the tachiko component which covers the surface of the coarse konjac flour, the thorough removal of the tachiko by means of the washing step, the adjustment of the concentration of the water-miscible solvent contained or entrained in the konjac flour before its drying and the drying temperature, and the sharp separation of the konjac flour and tachiko by the employment of the separation by settling technique.

The following examples are given to describe the invention more specifically. Unless otherwise specified, the percents in the examples are on a weight basis.

The viscosity used in the examples was measured in the following manner. Five grams of the product konjac flour were swelled in 500ml of water by stirring.

While stirring it is necessary to ensure that no bubbles of air enter the solution. After standing for six hours at room temperature, the measurement of viscosity of the solution was carried out at 25° ± 1°C. with a Brookfield viscometer.

The whiteness was obtained by comparison with the Munsell renovation system and was indicated by the name of the color which most closely corresponds.

EXAMPLE 1

Comminution step

Raw konjac tubers having the composition of about 12.0 percent konjac flour component, about 5.3 percent tachiko component and about 82.7 percent moisture content and as the pulverizing medium an ethyl alcohol-water mixture of a weight ratio of 54:46 were continuously fed at the rate of 2080 kg per hour for the raw konjac tubers and 4600 kg per hour for the pulverizing medium to a hammer mill of a pulverizing capacity of konjac tubers of 3000 kg per hour and having a slit of hole diameter 4 mm. The pulverizing medium was incorporated with 150 ppm of sodium sulfite. The konjac tubers, which were comminuted together with the pulverizing medium in the hammer mill, formed a slurry and came out of the hammer mill. The solids content of the slurry was about 5.8 percent and consisted of coarse konjac flour particles of a particle diameter of 0.02 – 2 mm with the average being about 1 mm and a tachiko powder of particle diameter of 0.01 mm or less.

First separation step

This slurry was delivered with a pump to a first centrifugal settling apparatus having a slurry treatment capacity of 5000 kg per hour. The slurry was continuously fractionated into a concentrated slurry containing 30 percent of the coarse konjac flour and a spent liquor containing the tachiko in a ratio of 15:85. The spent liquor was conveyed to a separated distillation apparatus for recovering the alcohol. The concentrated slurry containing the coarse konjac flour was conveyed by means of a screw conveyor to a 2000-liter mixing tank, where it was mixed with an ethyl alcohol-water mixture of a concentration of about 50 percent (58 volume percent) which was fed at the rate of 2800Kg per hour as the polishing medium, thereby forming a slurry having a solid content of about 8.7 percent.

Polishing step

This slurry was delivered to a polisher at the rate of about 3700Kg per hour, and the tachiko component still adhering to the surface of the konjac flour in the slurry was stripped. In this case a grinder having a slurry treatment capacity of 10 tons per hour was used as the polisher. The grinder is one in which a pair of phenolic resin-bonded carborundum disks are disposed in a casing with an interval of about 0.5mm so as to form frictional surfaces therebetween. One of the disks is a fixed disk while the other is a rotating disk. The fixed disk has a hole at its central part which is coupled at the back side of the surface facing the rotating disk, with a pipe which extends to the outside of the casing. The slurry which was fed as hereinbefore described via this pipe was polished between the frictional surfaces and thereafter proceeded from the periphery of the frictional surfaces into the casing and was withdrawn from a hole provided at the bottom of the casing.

Second separation step

The slurry which left the polisher and containing the konjac flour and the stripped tachiko was then pumped to a second centrifugal settling apparatus. The second centrifugal settling apparatus is of the same type as that used as the first centrifugal settling apparatus. The slurry was separated into a concentrated slurry containing the konjac flour and a spent liquor containing the tachiko in the same way as in the case of the first centrifugal settling apparatus. Since the spent liquor separated in this step contains the tachiko in an amount of only about 0.8 percent, it was recycled and reused as the pulverizing medium to be used at the beginning of the process.

Washing and adjustment of concentration step

The konjac flour was separated in the form of a slurry containing about 36 percent of solids. Thus slurry was conveyed at the rate of about 700 kg per hour to a washer for washing and removing the minute amount of tachiko still remaining. A differential specific gravity settling and separating tank having a conical bottom and equipped with an agitator in the neighborhood of its bottom was used as the washer. The concentrated slurry of konjac flour was fed from an inlet port provided at the side of the upper part of this tank and the wash liquid consisting of an aqueous ethyl alcohol solution of a concentration of 70 percent (78 percent by volume) was fed from an inlet provided at the bottom of the tank. The wash liquid while entraining the tachiko overflows, while the washed konjac flour is continuously withdrawn in the form of a slurry from an outlet provided at the side of the lower part of the tank. The alcohol concentration of the wash liquid mixed with the slurry in the washing tank was diluted to 67.5 percent (74 percent by volume). The spent wash liquid which overflowed was recycled to the polishing grinder for reuse as the polishing medium.

Third separation step

The slurry of konjac flour withdrawn from the washer and containing about 10 percent of solids was conveyed to a third centrifugal settling apparatus of the same type as that used in the first and second separation steps. At this third settling apparatus a concentrated slurry of solids content of 36 percent was obtained, which was then conveyed to a dryer.

Drying step

As the dryer a cyclindrical fluidized bed drying oven having a diameter of 3.20 meters and a height of five meters was used. The entry temperature of the hot air for drying was 130°C. and the exit temperature was 80°C. The solvent vapor which was carried off along with the hot air at the dryer was condensed and recovered. The konjac flour whose drying was completed was recovered as a product having a moisture content of 10.8 percent at the rate of 280 kg per hour. The dwell time of the konjac flour in the dryer was about 60 minutes.

The konjac flour obtained by this example was an excellent one having a viscosity of 67,500 centipoises and a whiteness of N 9.5.

Similar results were obtained by repeating the foregoing experiment, except that an aqueous solution of 5 percent ethyl acetate-modified ethyl alcohol was used as the pulverizing medium as well as the polishing medium.

EXAMPLE 2

Example 1 was repeated except that the washing step and the next following third separation step were omitted. A product having a moisture content of 10.7 percent was obtained at the rate of 297 kg per hour.

The konjac flour product obtained by this example had a viscosity of 20,500 centipoises and a whiteness of N 9.5.

EXAMPLES 3 – 5

Example 1 was repeated except that the concentration of the ethyl alcohol wash liquid used in the washing step was varied from the 70 percent (78 percent by volume) used therein. Concentrations of 60 percent (68 percent by volume), 50 percent (58 percent by volume) and 40 percent (47 percent by volume) were used, respectively. The ethyl alcohol wash liquid of these concentrations, on being mixed with the slurry in the washing tank, were diluted by means of the water contained in the slurry to about 53.2 percent (61 percent by volume), 44.3 percent (52 percent by volume) and 35.4 percent (42 percent by volume), and the ethyl alcohol was entrained thereafter in the konjac flour in these concentrations until the completion of the drying step. The properties of the products obtained are shown in the following table along with that of the product of Example 1.

| Example | Ethyl Alcohol Concentration (%) | | Properties of Product | |
|---|---|---|---|---|
| | Before mixing | After mixing | Viscosity (cps) | Whiteness |
| 1 | 70 | 67.5 | 67,500 | N 9.5 |
| 3 | 60 | 53.2 | 66,600 | N 9.5 |
| 4 | 50 | 44.3 | 65,900 | N 9.5 |
| 5 | 40 | 35.4 | 64,300 | N 9.5 |

EXAMPLE 6

Example 1 was repeated except that a differential specific gravity settling tank was used instead of the centrifugal settling apparatus in the first, second and third separation steps of Example 1.

The starting tubers were processed at the rate of 2080 kg per hour, and a product konjac flour having a moisture content of 10.8 percent was obtained at the rate of 272 kg per hour. The viscosity of the product was 75,000 centipoises and its whiteness was N 9.5.

EXAMPLE 7

Example 1 was repeated except that the polishing step was omitted. A konjac flour product having a moisture content of 10.7 percent was obtained at the rate of about 3000 kg per hour.

The viscosity of the product obtained was 15,000 centipoises and its whiteness was N 9.5.

EXAMPLE 8

Starting konjac tubers of the same kind as in Example 1 were fed at the rate of 2080 kg per hour, along with 10,400 kg per hour of water, to a hammer mill identical to that used in Example 1. The water was incorporated with 150 ppm of sodium sulfite. The tubers were comminuted in the hammer mill with the water to form a slurry of a solids content about 3 percent and containing konjac flour of particle diameters 0.02 – 2 mm with an average of of 1 mm, and a tachiko powder of a particle diameter of less than 0.01 mm.

The slurry was continuously withdrawn from the hammer mill and conveyed to a centrifugal dryer. The centrifugal dryer used was one equipped with a conical basket-type dehydrating tank of a maximum diameter of 1.00 meter and a height of 0.6 meter and having slurry treatment capacity of 5000 liters per hour. The tachiko along with the spent liquor was discarded by means of this centrifugal dryer and a coarse konjac flour was separated as a slurry with a solids content of 20 percent.

This slurry was conveyed to a mixing tank as in Example 1 and mixed with an aqueous alcohol of a concentration of 70 percent (78 percent by volume) to yield a slurry having a solids content of 6.7 percent. The swelling of the konjac powder by means of its entrained water was prevented by this step.

The slurry was then conveyed to a polisher similar to that used in Example 1, and the tachiko component still remaining adhered to the surface of the coarse konjac flour particles was stripped. The slurry was fed to the polisher at the rate of 3400 kg per hour. The polished slurry was conveyed to a centrifugal settling apparatus of the same type as used in Example 1, and a slurry containing 30 percent of solids consisting of konjac flour was separated. The alcohol concentration of the slurry containing the konjac flour was reduced to 50 percent (58 percent by volume). This slurry was dried as in Example 1, and a konjac flour product having a moisture content of 10 percent was obtained at the rate of 230 kg per hour.

The viscosity of the product was 65,000 centipoises and its whiteness was 2.5 Y 9/0.5.

What is claimed is:

1. A method of selective separation of konjac flour from the tubers of Amorphophallus konjac, C. Koch, which comprises the steps of comminuting said tubers in a liquid medium to form a slurry consisting of coarse konjac flour particles of a particle diameter of above about $2 \times 10^{-2}$ mm and a tachiko powder of a particle diameter not greater than $1 \times 10^{-2}$ mm in suspension in said liquid medium; separating and withdrawing said coarse konjac flour particles from said slurry; polishing the withdrawn coarse konjac flour particles in a water-miscible organic solvent to strip from the surface of said coarse konjac flour particles the tachiko component that still remains adhered thereto; withdrawing the konjac flour from the water-miscible organic solvent; and thereafter drying the withdrawn konjac powder to obtain the konjac flour product.

2. The method of claim 1 wherein said liquid medium is a water-miscible organic solvent.

3. The method of claim 1 wherein said liquid medium is water.

4. The method of claim 1 wherein the konjac flour to be dried contains or has adhered thereto the water-miscible organic solvent at a concentration of at least 30 percent by volume and the drying temperature ranges between 50° and 130°C.

5. The method of claim 1 wherein said pulverizing medium contains a salt selected from the group consisting of the sodium and potassium salt of sulphurous and hyposulfurous acid.

6. The method of claim 1 wherein the konjac flour is separated with a centrifugal settling apparatus.

7. The method of claim 1 wherein the konjac flour is separated by means of a difference in specific gravities.

8. The method of claim 2 wherein the konjac flour prior to its drying is washed in a water-miscible organic solvent of such concentration and amount that the final concentration of the solvent is at least 50 percent, and the konjac flour is dried at a temperature ranging between 50° and 130°C.

* * * * *